Feb. 7, 1967    J. S. WOOLLATT ETAL    3,302,432
SEALS FOR PRESSURE VESSELS OR THE LIKE
Filed May 21, 1964    4 Sheets-Sheet 1

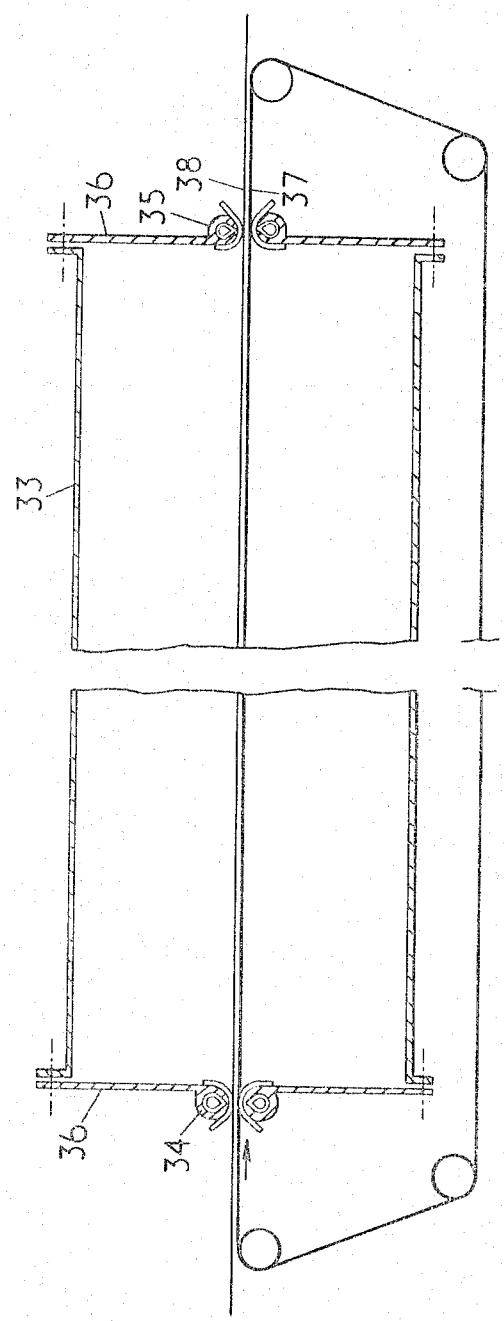

ered trademark) in which it is important that the bulki-

United States Patent Office 3,302,432
Patented Feb. 7, 1967

3,302,432
SEALS FOR PRESSURE VESSELS OR THE LIKE
John S. Woollatt, Cheshire, and Bernard Davey, Alkington, Middleton, Manchester, England, assignors to Mather & Platt Limited, Lancashire, England, a British company
Filed May 21, 1964, Ser. No. 369,207
Claims priority, application Great Britain, May 31, 1963, 21,840/63
8 Claims. (Cl. 68—5)

This invention relates to a seal for a pressure vessel or the like for example as used in the treatment of textiles.

In certain textile processes it is necessary to hold cloth at a temperature exceeding 212° F. while in the presence of steam. This steam treatment is normally carried out in a pressure vessel. It has previously been proposed to treat cloth in a pressure vessel in batch form in which a batch of cloth is fed into the vessel and the opening through which it enters is then sealed off. It has also previously been proposed to provide a pressure vessel through which a length of cloth can continuously be fed through a seal at the entrance to and exit from the pressure vessel. Such seals, however, are complicated mechanically.

An object of the present invention is to provide an improved form of seal for a pressure vessel through which fabric to be treated can be continuously passed.

According to the present invention there is provided a seal for an opening in a pressure vessel through which material to be treated can be continuously passed for treatment comprising a housing enclosing the major part of an inflatable element, the element being adapted to be inflated so that the unenclosed portion of the element projects through the housing to make, in conjunction with a backing member, a seal on the material being passed therethrough.

Conveniently the backing member also comprises a housing and inflatable member, the unenclosed portions of both inflatable members projecting through their respective housings each to make a seal on to the cloth being passed therethrough.

Figure 1:
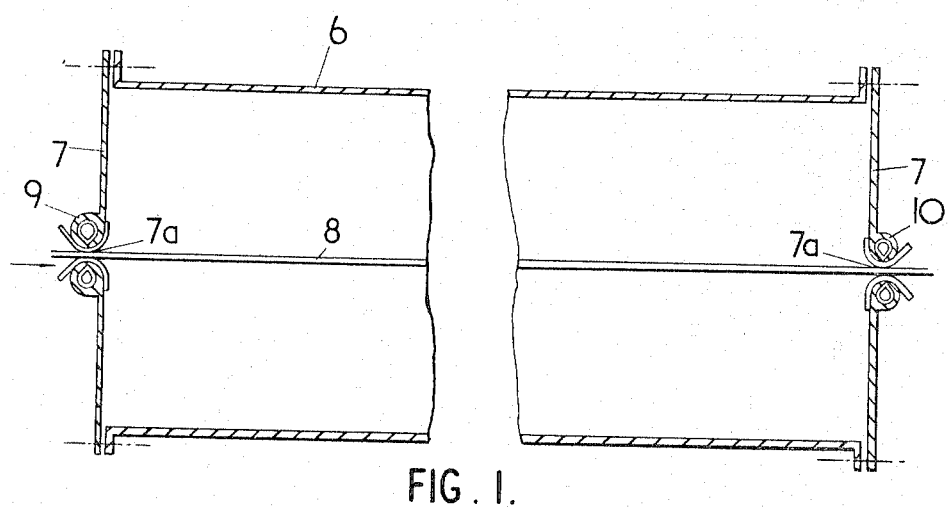
Figure 5:
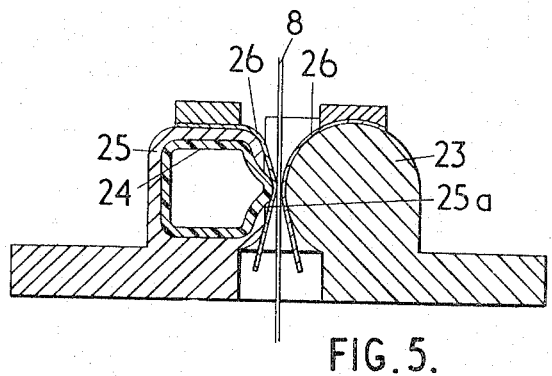
Figure 2:
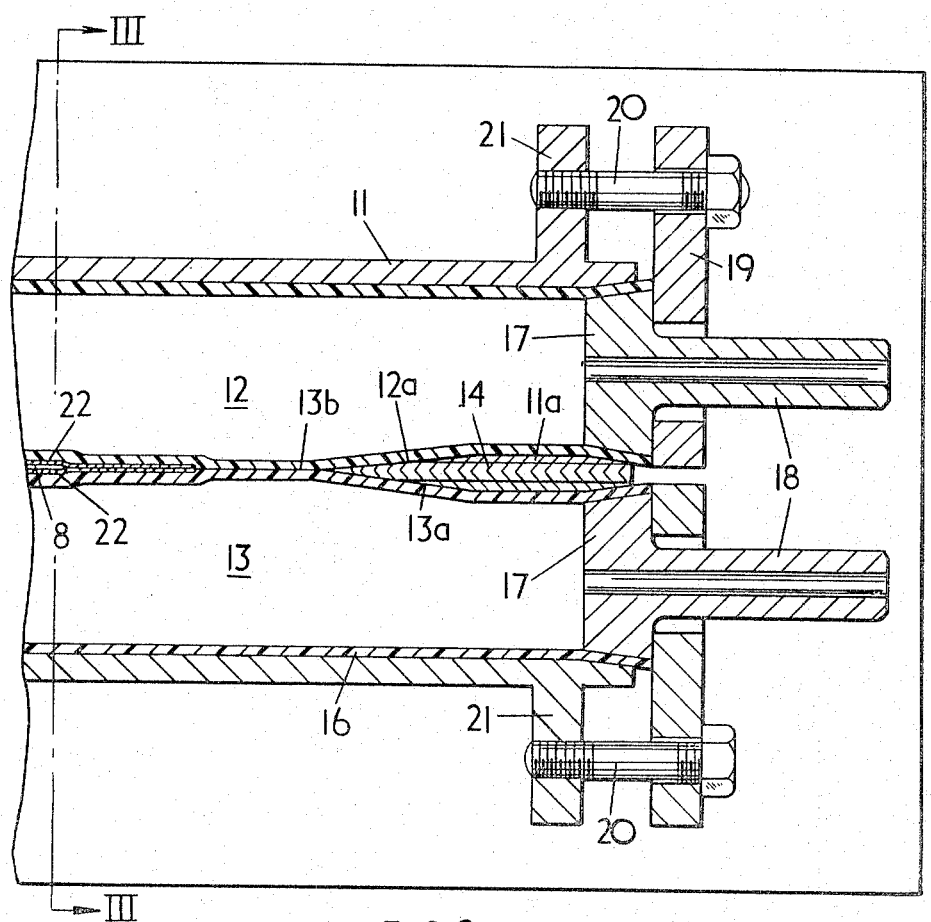
Figure 7:
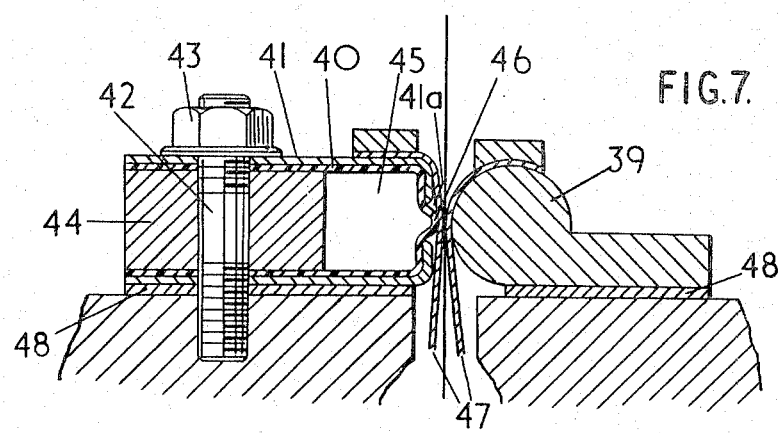
Figure 3:
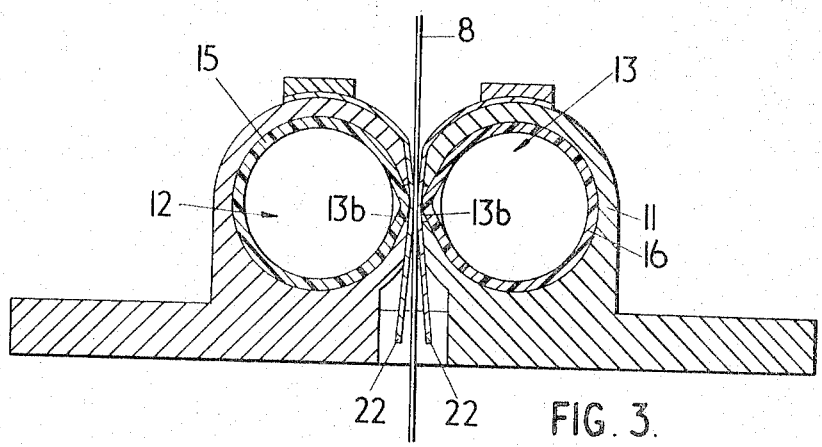
Figure 4:
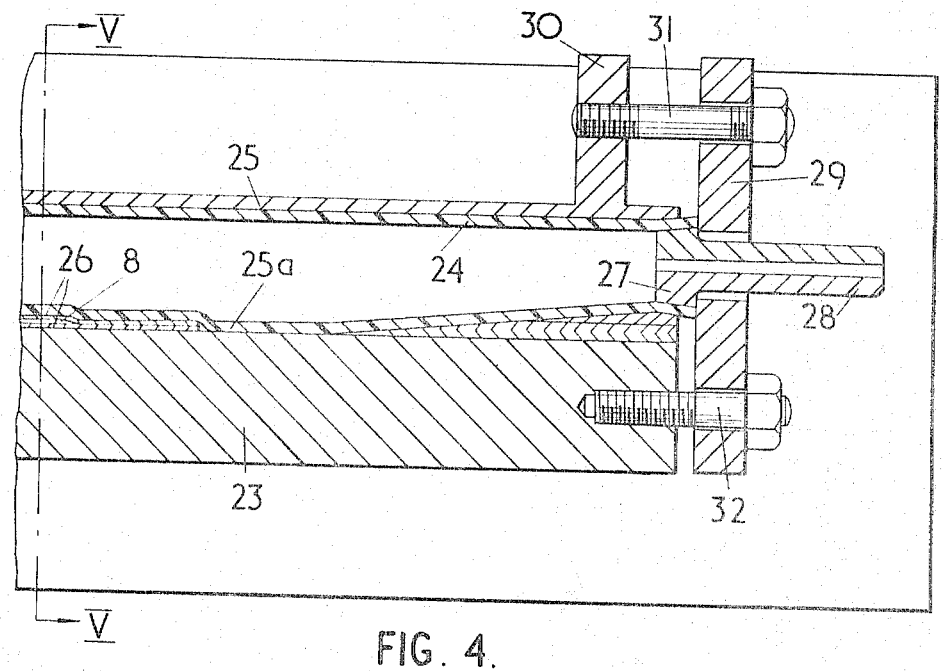

Embodiments of the invention will now be described, by way of example with reference to the accompanying drawings in which:

FIGURE 1 is a diagrammatic view of a pressure vessel having a seal fitted at each end thereof, FIGURE 2 is a part longitudinal sectional view of one embodiment of a seal in accordance with the invention, FIGURE 3 is a cross sectional view on the line III—III of FIGURE 2, FIGURE 4 is a part longitudinal sectional view of a second embodiment of the invention, FIGURE 5 is a cross sectional view on the line V—V of FIGURE 4, FIGURE 6 is a diagrammatic view of a pressure vessel provided with means for supporting material to be treated during its passage through the vessel, and FIGURE 7 is a cross-sectional view of a third embodiment of the invention.

As illustrated in FIGURE 1 a pressure vessel for the continuous treatment of cloth comprises pressure chamber in the form of a cylindrical body 6 closed at each end by an end wall 7. Each end wall 7 has an elongated opening therein whereby a continuous length of cloth 8 or the like can be passed into the pressure vessel through a seal 9 fitted to one of the end walls 7 and withdrawn from the vessel through the opening in the other end wall 7 on which is mounted a seal 10.

In a first embodiment of the invention and as illustrated in FIGURES 2 and 3 a seal for an opening in a pressure vessel is arranged to be mounted on an end wall of the vessel between support plates (not shown). The seal comprises a housing 11 defining twin cylindrical bores 12 and 13 each having a slot opening into a central slit for the passage of cloth. Each end of the central slit is defined by a wedge 14 between opposing faces of the housing 11. Within each bore 12 and 13 is enclosed for its major part an inflatable rubber tube 15 and 16 respectively and each end of each tube is sealed by a tapered plug 17 having an integral nozzle 18 in which air can be fed into or withdrawn from the interior of the tube. The plugs 17 are retained firmly in place by a locking plate 19 which has apertures through which the conduits 18 project, the plate 19 being secured by bolts 20 to lugs 21 on the housing 11.

Over the central portion of the slit in the intermediate wall 11a, antifriction liners 22 for example of polytetrafluoroethylene or stainless steel are provided. The liners 22 serve to reduce the wear on each tube 15 and 16 and the coefficient of friction between the cloth and the seal.

In operation of the pressure vessel the cloth 8 is passed through the seal at one end and emerges through the seal at the other end. To make each seal effective, air is admitted to each of the two rubber tubes 15 and 16, until each tube protrudes through the central slit defined by the wedges 14 so as to tend to contact each other and thus form a seal on to each side of cloth 8 being passed therethrough.

In an alternative embodiment of the invention as illustrated in FIGURES 4 and 5, one of the bores having an inflatable tube therein is dispensed with and is replaced by a further form of backing member consisting of a rigid element 23 extending the length of the single inflatable tube 24. In this case the single tube 24 is inflated so as to protrude from the slits in its housing 25. The cloth 8 is then passed between the tube 24 and the rigid backing member 23 so that the seal is made on one side between the tube 24 and the cloth 8 and on the other side between the cloth 8 and the backing member 23.

In the same manner as in the first above-described embodiment, the housing 25 and the backing member 23 are each provided with antifriction liners 26 and the tube 24 is sealed at each end by a plug 27 having a nozzle 28 through which air can be introduced into or withdrawn from the tube. The plug 27 is retained in place by a locking plate 29 which passes over the nozzle 28 to be secured to a lug 30 on the housing 25 and to the backing member 23 through bolts 31 and 32 respectively.

The two embodiments described above refer to seals for use on pressure vessels in which cloth or the like in web form is to be treated. Such cloth has sufficient tensile strength to be drawn through the vessel without any form of support. The invention can, however, be equally well employed for the processing of slivers of cotton and similar materials which, in themselves have insufficient tensile strength to be drawn through a seal and also for the processing of other materials in a similar state such as tow of Nylon (registered trademark), or Terylene (registered trademark) in which it is important that the bulkiness of the tow be preserved.

In such an arrangement as illustrated diagrammatically in FIGURE 6, a pressure vessel 33 has seals 34 and 35 mounted on each end wall 36 thereof. Through the inlet seal passes an endless conveyor belt 37 of known construction, the belt extending through the vessel before emerging via the outlet seal. As the belt is actuated by any suitable known means to travel through the vessel, slivers 38 of material such as cotton, Nylon or similar materials are fed on to the belt so as to be passed for treatment through the vessel.

In a third embodiment of the invention as illustrated in FIGURE 7, the seal comprises a rigid backing member 39 which co-operates with a non-tubular inflatable element formed by a rubber lining 40 conforming to the internal surface of a channel-shaped housing 41. The rubber lining 40 is clamped in position by means of bolts 42 and associated nuts 43, the bolts passing through a distance piece 44 which clamps the lining 40 between it and the sides of the channel-shaped housing 41. At the same time the distance piece 44 defines a bore 45 with the end wall of the housing and on air being admitted to the bore 45, the lining 40 is inflated so that a portion 46 protrudes through a slit in the end wall of the housing thus forming a seal with the backing member 39 on either side of the cloth 8 being passed therebetween. Antifriction liners 47 are provided as in the embodiments previously described and if desired the backing member 39 and housing 41 can be mounted on resilient rubber pads 48 as illustrated in FIGURE 7.

The cross-sectional shape of the inflatable tubes can be of any suitable shape. For example, they can be of circular cross-section as in the embodiment shown in FIGURES 2 and 3 or they can be of square section as in the embodiment of FIGURES 4 and 5. Further, it has been found suitable to maintain the pressure in each inflatable tube or element at approximately 3 to 20 lb./sq. in. above the pressure in the pressure vessel with which they are used.

What we claim is:

1. A seal for an opening in a pressure vessel through which material to be treated can be continuously passed for treatment comprising a housing enclosing a major part of an inflatable open-ended element, a backing member, a plug closing each end of the element, and air inlet means in at least one of said plugs whereby the element can be inflated to cause the unenclosed portion thereof to project through the housing to make, in conjpunction with the backing member, a seal on the material being passed therethrough.

2. A seal as claimed in claim 1, in which the backing member also comprises a housing enclosing a major part of an inflatable open-ended element, a plug closing each end of the element, and air inlet means in at least one of said plugs whereby the elements can be inflated to cause the unenclosed portions thereof to project through their respective housings to contact each other in sealing relationship.

3. A seal as claimed in claim 1, in which the inflatable element comprises a tube.

4. A seal as claimed in claim 1, in which the inflatable element comprises a sheet of extensible material, the lateral edges of said material being clamped to a common spacer element whereby a bore is defined by the sheet and the spacer element.

5. A seal as claimed in claim 1, in which an antifriction lining is provided betwen the inflatable element and its co-operating backing member.

6. A pressure vessel for the continuous processing of materials comprising a pressure chamber into which material to be treated can be continuously passed, said material being fed into and withdrawn from the chamber through a seal comprising a housing enclosing a major part of an inflatable open-ended element, a backing member, a plug closing each end of the element, and air inlet means in at least one of said plugs whereby the element can be inflated to cause the unenclosed portion thereof to project through the housing to make, in conjunction with the backing member, a seal on the material being passed therethrough.

7. A pressure vessel as claimed in claim 6, in which the pressure in each inflatable element of each seal is maintained at 3 to 20 lb./sq. in. above the pressure in the pressure chamber.

8. A pressure vessel as claimed in claim 6, in which conveying means are provided for supporting the material to be treated during its passage through the pressure vessel.

References Cited by the Examiner

UNITED STATES PATENTS

| | | |
|---|---|---|
| 879,867 | 2/1908 | Grau. |
| 1,632,760 | 6/1927 | Jones. |
| 2,606,046 | 8/1952 | Bonner et al. |
| 2,736,632 | 2/1956 | Blau _____ 68—5 X |
| 2,932,183 | 4/1960 | Richeson _____ 68—5 |
| 2,974,512 | 3/1961 | Carter _____ 68—5 |

FOREIGN PATENTS 15,429/62 9/1962 Japan.

IRVING BUNEVICH, *Primary Examiner.*